Figure 1:
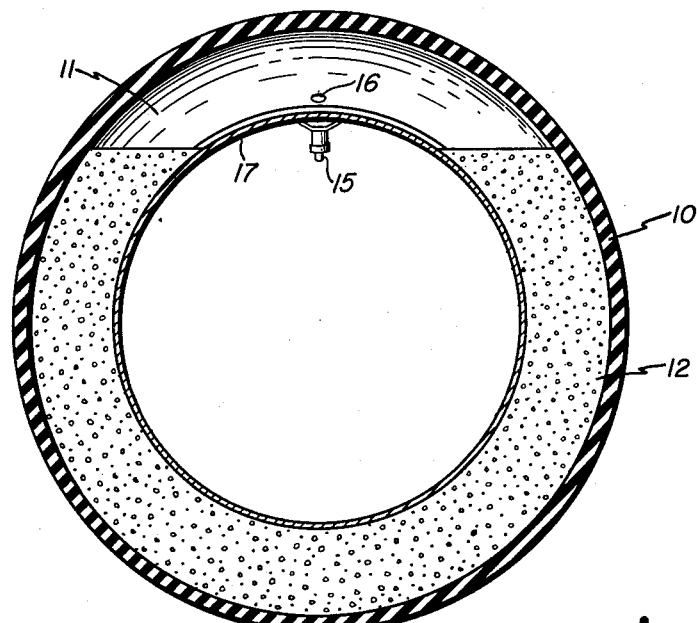

Nov. 14, 1961   W. L. HICKS   3,008,506
PNEUMATIC TIRE BALLAST
Filed March 5, 1959

INVENTOR.
William L. Hicks
BY
ATTORNEYS

United States Patent Office

3,008,506
Patented Nov. 14, 1961

3,008,506
PNEUMATIC TIRE BALLAST
William L. Hicks, Boulder, Colo., assignor to Led Ballast, Inc., Boulder, Colo., a corporation of Colorado
Filed Mar. 5, 1959, Ser. No. 797,476
6 Claims. (Cl. 152—330)

This invention relates to ballast for vehicle tires and more particularly to ballasted pneumatic vehicle tires, the dry ballast for such tires, and the method of making the same.

In my co-pending application, Serial No. 537,259 filed September 28, 1955 for "Vehicle Tire Ballast," now Patent No. 2,884,039 dated April 28, 1959, there is described and claimed a ballasted vehicle tire which comprises a pneumatic tire under usable air pressure and a dry ballast, which when settled fills 80 to 97% of the tire. This ballast is defined as comprising a powder in sufficient quantity and of such a character that on agitation, it becomes air-borne. Thus on rolling, the tire is more completely filled with the air-borne powder. This air-borne ballast provides weight in the tire, prevents loping, vibration and other undesirable movements and action as the machine on which the tire is mounted moves.

As pointed out in my co-pending application, one problem in the operation of the prime mover or other vehicle operating over a rough or uneven terrain, is to provide a more flexible pneumatic tire, and/or spring suspension which will absorb the shock of wheel movement over the uneven surface so that such shock is not transferred to the body of the vehicle. Rubber tires may be made more flexible, for example, by operating at a lower air pressure or by making the carcass more flexible. The lower air pressure increases the wear of the tire, since the more flexible pneumatic tire, whether produced by the low air pressure or the flexible carcass, introduces another factor to the problem. This added problem is an increased tendency of the vehicle to bounce. Some of the early pneumatic tires reduced bounce by operating at higher air pressures. Thus with narrower and smaller vehicle tires, e.g., three inch cross section tires, the operating pressure was maintained high, in the order of 60 pounds or more, to reduce the bounce. During the development of tractors and the like, the demand for higher speed and easier riding caused a return to broader, lower pressure tires to provide a more flexible tire, and thus reduce the hard riding characteristics. In one case, for example, the cross section of the tire was increased to six inches and the operating pressure reduced to about 30 pounds for a tire made to carry essentially the same weight as the aforementioned smaller tire. As the air pressure is reduced and the cross section of the tire is increased, however, the bounce of the tire is increased.

Normally, heavy rubber-tired vehicles which are intended for heavy work, such as tractors, scrapers, road maintainers, compacters and the like, are built without springs on the rear wheels of the unit. As a result, the tire is the member to absorb shock. To carry the heavy loads required, such tires have been designed bigger and wider, but the problem of bounce has been aggravated.

I have now found that a highly effective ballast for a pneumatic vehicle tire may be prepared by combining a certain minimum amount of finely divided dry material with a granular material. This mixture adds the necessary weight to the vehicle tire, provides an essentially air-borne mixture, and occupies a specific portion of the air space within the tire. This prevents loping, vibration and the like.

An important object of the present invention is to provide a ballasted vehicle tire which provides weight for operation of a vehicle and which does not lope, have undue vibration or other undesirable motions. Another object of the invention is to provide a ballasted vehicle tire which may be inflated to normal operating air pressure, and which contains a mixture of dry materials which, when agitated by rotation of the tire, produces with the air in the tire a fluid mass that substantially fills the tire.

It is still another object of the invention to combine with relatively coarse powder or granular material of a specific density, a portion of powdered material having a fineness of substantially 100 mesh or finer, in sufficient quantity to occlude air on agitation of the mass to thereby make the entire mass essentially air-borne for accomplishing the results set out above. Another object of the invention is to provide a ballast as a mixture of two materials which may be readily separated, and subsequently mixed in a different proportion.

Figure 2:
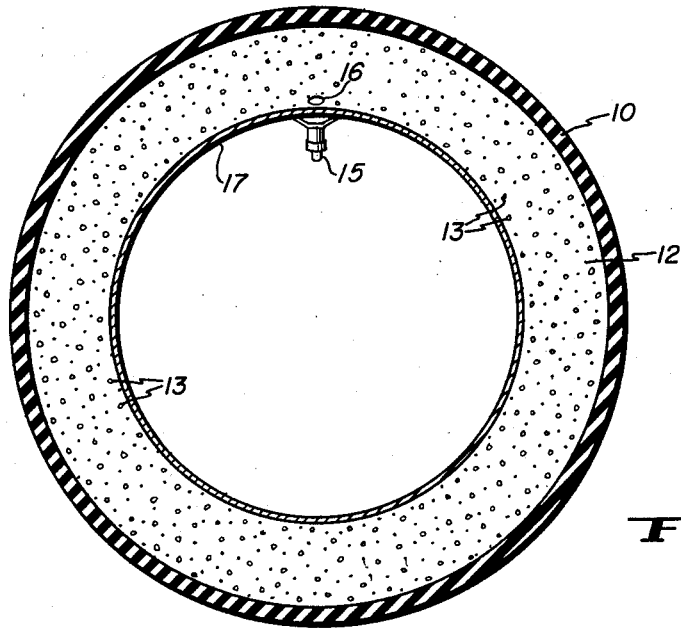

Other objects and advantages may be readily ascertained by referring to the following specification and appended illustrations in which:

FIG. 1 is a vertical cross-sectional view of a tire partially filled with settled ballast; and, FIG. 2 is a similar vertical cross-sectional view of the tire in FIG. 1, showing the ballast after it has been rotated several times to agitate it with the air in the tire.

In the illustration, a pneumatic, rubber tire 10 provides an annular chamber having at the upper portion thereof an air space 11. The remainder of the chamber is filled with a dry, particulate ballast 12 having larger particles or granular material 13 intermixed with fine powder, explained in detail below. The rubber tire 10 is shown to be supported on a rim 17 and having valve 15 opening into the tire through hole 16.

In FIG. 1, the ballast is shown in settled condition, that is, where the particulate mass contains only a minimum quantity of occluded air, and this settled material is quite solid to the feel. This condition is approached by tapping the tire with a hammer to permit the occluded air to pass up through the mass to the top part of the chamber. The settled material fills from 80 to 97% of the volume of the tire. After the tire is filled to the desired amount of ballast, air under pressure is introduced into the tire to the normal operating pressure of the tire. This pressure is usually the recommended pressure of the manufacturer. On rotation of the tire, usually two or three revolutions is all that is necessary, the ballast mass is agitated and it becomes essentially air-borne, as illustrated in FIG. 2, substantially filling the tire with the air-borne powder. In this condition, the tire has essentially all of its characteristics as a pneumatic tire, being capable of flattening under pulling loads, flexing under bumps and the like, and generally acting as a pneumatic tire.

The ballast of the invention is a relatively coarse or granular material combined with a critical minimum quantity of very fine material, having a fineness of 100 mesh or finer, so that during agitation or rotation of the material, air is effectively occluded within the mass so that the entire mass becomes air-borne fluid, and substantially fills the tire. The granular and finely powdered materials do not separate on continued agitation, but remain an essentially homogeneous mass. The fine powder is interspersed with the granular material maintaining the fluid and air-borne characteristics of the agitated mass.

At least 20% of the granular material must be a very fine material having the described fineness of 100 mesh or finer. The size of the particles of granular material ranges from 10 to 100 mesh, preferably in 15-30 mesh range, and may be of any dry organic or inorganic material. The granular material may be of the same composition as the finely powdered material, or it may be of a different composition. The ballast may, therefore, consist of such suitable granular material as silica, limestone, bentonite, kaolin clay, iron ore, barium sulphate, or substantially any particulate matter which provides the desired weight for the ballast and mixes with the fine powder. The finely powdered material must be capable of occluding air within the complete mixture in the tire. Certain materials not only provide sufficient occlusion of the air but, also, provide lubrication of material in the tire, for example, talc, soapstone, etc.

One important aspect of providing the combination of granular material and finely powdered material is that the density of the combined material may be effectively changed to suit the requirements of a particular operation. For example, a tractor may be designed for the addition of 1000 pounds of a ballast to the rear axle or driving tires of the machine. Engine wear, a change in compression ratio of the engine, or a change in tire size or design may make it desirable to change the weight of ballast in the tires. Since the volume of fill of the tire cannot be appreciably changed, the ballast may be removed from the tire, separated into its two constituents and the ratio of the constituents changed or the ingredients changed to produce a different density.

The ratio of volume of air to ballast may be changed by selection of the material of the ballast. For example, perlite granules, which under the microscope appear as a hollow ball, may be mixed with a fine powder in only a sufficient quantity to occlude air on agitation. This produces a ballast of a specific weight per cubic foot. Thus the weight of the requisite amount of ballast may be determined. For another application, this ballast may be removed from the tire, separated by screening, and mixed in a different ratio to give a different weight per cubic foot, which for essentially the same volume of ballast is a different total weight, producing a different bounce characteristic, due to a change in the air volume ratio of the granular substance.

In filling a tire casing, one or more openings in the tire may be employed, these openings being closed after the filling operation. The tire may then be inflated under pressure to the normal operating pressure for the particular type of tire employed. If desired, the pressure may be increased above or may be maintained below the normal operating pressure, without impairing the operation of the ballast. Farm tractor tires normally use pressure of 14 to 15 pounds, but for other types of tires, for example earth moving equipment tires, the pressure may vary from 10 to 20 pounds. In each case, the particulate ballast becomes air-borne on agitation and performs as a pneumatic tire with essentially no bounce under normal conditions.

High speed operation of tractors or other rubber-tired vehicles may be obtained without rocking or jerking action and without producing imbalance and vibrations when the tires of such vehicles contain the dry ballast mixtures of the invention. The fine powder of the ballast maintains the coarse ballast air-borne during such high speed rotation, and prevents free gravitational fall or centrifugal separation of the coarse material. This maintains the tires substantially full of a homogeneous, compressible air-borne ballast, and these tires retain their essential pneumatic riding and flexing characteristics even under the high speed conditions.

Air-borne ballast in the tire acts as a shock absorber, reducing the bounce and shock on the vehicle axle. The energy of such bouncing and shock is dissipated within the air-borne ballast itself and is not transmitted through the tire to the vehicle axle.

The following examples illustrate the use of ballast with various types of rubber-tired vehicles:

*Example I*

A garden tractor with two 6:50 x 16 tires was filled with a dry mixture containing 50% by weight of 20 mesh sea sand and 50% by weight of 300 mesh kaolin. Each tire when filled to 90% of its capacity (settled ballast) held 130 pounds of this mixture. When allowed to stand overnight, the powder mix was definitely more on the bottom side of the tire, as noted by the initial lopsided rolling of the tires. However, upon two turns of the tires, they became balanced and rolled as easily as air-filled tires. This indicated that in the static condition the ballast settles losing some of the occluded air. Upon rotation, the powder within the tires is aerated substantially filling the tires. Operation of the tractor over rought gravel showed the pneumatic action of the tires.

To determine the effect of a non-aerating ballast in a tire, the two 6:50 x 16 tires of the garden tractor of this example were emptied and then refilled to 90% of their capacity with dry 20 mesh sea sand. When the filled tires were inflated to 10 pounds operating pressure and rolled, it was noted that the tires were lopsided and continued to lope. After many revolutions of the tires, the loping continued and it was evident that the sand did not fluff up and fill the tire to get away from the unbalanced condition.

The granular and finely powdered material of the ballast may be separated by relatively simple physical means, such as a screen or air separation, and the recovered material may then be mixed with different materials or on different quantity ratio to produce a composition of different density and physical properties. In one preferred form, the quantity of finely powdered talc to granular material is from 30 to 50% by volume, the talc being ground to 300 mesh or finer, and the granular material being about 15 mesh. The approximate ratio of settled density of the composition to true density is 1 to 2.2. With such a relatively large amount of talc it is economical to separate and recover the talc for reuse and mix it with either a different granular material or different amount of the same granular material so as to change the density or ratio of settled density to true density. In the normal case, a substantial amount of ballast is used, which for a farm tractor may be from 2,000 to 4,000 pounds. Thus the amount of ballast used for each vehicle represents a substantial amount of material.

In filling the tires with the ballast, as has been pointed out above, the desired volume of ballast is from 80 to 97% of the volume of the tire, calculated to the maximum settled density of the ballast. To provide a simplified method of determining a settled density for the ballast, I have developed a laboratory method for determination of the volume under this condition. The material is placed in a graduated cylinder and tamped with a piston-like rod, and the cylinder itself also tapped against a table to settle the contents. After a few minutes of tamping, this composition is packed to what appears to be the practical maximum compaction, i.e., minimum volume, where the material is hard to the feel and difficult to push a pencil or sharp instrument into the mass. The density of the compacted material is then determined, and this density may be used for calculating the fill of a tire.

For application in controlling bounce of a given tire, the ratio of this settled density to true density may be determined. The true density is determined by standard methods known to the pigment trade. For determination of air entraining qualities of a particular ballast composition, the increase of volume occupied by a specific quantity of ballast material at its normal volume without compaction over the volume at its settled density, this is determined as a percentage of occluded air.

*Example II*

A ballast composition was prepared by using pulverized iron ore which was screened to provide an essentially uniform particle size of between 15 and 30 mesh. This material when mixed with air had no entraining qualities, that is, it immediately settled to approximately maximum density with essentially no occluded air. To about 100 pounds of this mixture was added about 30% by weight of pulverized talc, which analyzed 98% through a 300 mesh screen. This mixture was pumped into a pair of standard tube-type tires, the fill of the ballast in the tires being about 91% of its capacity, calculated on the settled condition of the ballast mixture. The tires were inflated and then placed on a farm tractor which operated under field conditions. The tractor operated very well, and even at five miles per hour the tractor wheels operated as though they were balanced and only air filled. The damping action of the tires against bumps and bounces indicated that the powder in the tires was fully pneumatic.

*Example III*

Two 12:28 tires were filled for a farm tractor using a mixture of fine material and coarse granular material, testing as follows:

|  | Screen Analysis, percent | | | Settled Density | Percent Occluded Air by Volume |
| --- | --- | --- | --- | --- | --- |
|  | Thru 10 | Thru 100 | Thru 300 | | |
| Talc | 100 | 100 | 98 | 1.17 | 110 |
| Iron | 100 | 2 | 0 | 2.92 | 3 |
| Mix: | | | | | |
| 30% Talc | } 100 | 20 | 29 | 2.31 | 68 |
| 70% Iron | | | | | |

It was determined that the tires were filled to 83% of the maximum capacity, based on the settled condition of the ballast. The tires were jacked up and observed after setting and pounding the tires several times. It was noted that the tires could not be turned easily by hand, indicating an unbalanced condition. When turned with the power of the tractor for two turns, it was then possible to continue turning the tires easily by hand, indicating that the ballast had fluffed up inside the tire substantially filling the tire and making it essentially balanced under dynamic conditions.

In field operation of the tractor, it was observed that the added weight did not produce a dead undue drag on the tractor, as is often noted with liquid ballast. The riding quality of the tractor was much improved over the same unit with all air-filled tires, which indicated the shock absorbing quality of the ballast.

*Example IV*

Two 7:50 x 15 automobile tires were filled with a ballast as follows:

|  | Screen Analyses, percent | | | Settled Density | Percent Occluded Air |
| --- | --- | --- | --- | --- | --- |
|  | Thru 10 | Thru 100 | Thru 300 | | |
| Talc | 100 | 100 | 98 | 1.17 | 110 |
| Plastic Balls | 100 | 0 | 0 | 0.12 | 3 |
| Aluminum Pwd | 100 | 100 | 98 | | |
| Ballast Mix: | | | | | |
| Talc—20% | | | | | |
| Pl. Balls—78% | } 100 | 20 | 19 | 0.19 | 89 |
| Al Powder—2% | | | | | |

The plastic balls were produced from a plastic solution so dried that it produced small spherical balls of a very low density.

When filled to 82% of the capacity, it was observed that the tires had much less of a tendency to bounce than an all air-filled tire. When operated on an automobile at speeds of up to 30 miles per hour, the tires bounced less than an all air-filled tire. When operated for 100 miles at 60 miles per hour, it was observed that very little heat developed within the tire indicating the heat conductivity of the ballast containing the aluminum powder.

Material that stays on a given screen is the oversize or plus (+) of that screen; that passing is the undersizer or minus (—). Thus in the table under Example III the talc is —300 mesh, and the iron is in the range of —10 to +100 mesh, or nominally 10 to 100 mesh, which may be termed granular material.

While the invention has been illustrated by reference to specific illustrations, there is no intent to limit the spirit and scope thereof to the precise details so set forth except insofar as defined in the following claims.

I claim:
1. A ballasted vehicle tire comprising a resilient vehicle tire having an annular sealed chamber inflatable with gas under pressure, a particle ballast partially filling said chamber to approximately 80–97% of its capacity when the tire is at rest, and leaving a void of 3–20% at the top of the tire, a gas maintained in said chamber under pressure to inflate said tire and to provide a pneumatic tire capable of flattening out under heavy pulling loads, said ballast being a mixture the major portion of which is a granular material of an average particle size substantially greater than 100 mesh and less than 10 mesh and a minor portion of which is a fine powder the particles of which have a fineness of 100 mesh or finer, the quantity of the fine powder being sufficient that during rotation of the tire the ballast including the said granular material is entrained in the enclosed gas substantially filling the volume of the tire with a densified, compressible pneumatic medium for the tire.

2. A ballasted vehicle tire comprising a resilient vehicle tire having an annular sealed chamber inflatable with gas under pressure, a particle ballast partially filling said chamber when the tire is at rest, and leaving a void of 3–20% at the top of the tire, a gas maintained in said chamber under pressure to inflate said tire and to provide a pneumatic tire capable of flattening out under heavy pulling loads, said ballast being a mixture of not more than about 80% of a granular material of about 10 to 100 mesh and fine powder particles having a fineness of 100 mesh or finer, the amount of the fine powder being sufficient that during rotation of the tire the ballast is entrained in the enclosed gas substantially filling the volume of the tire with a densified compressible pneumatic medium for the tire.

3. A ballasted vehicle tire comprising a resilient vehicle tire having an annular sealed chamber inflatable with gas under pressure, a particle ballast partially filling said chamber when the tire is at rest, and leaving a void of 3–20% at the top of the tire, a gas maintained in said chamber under pressure to inflate said tire and to provide a pneumatic tire capable of flattening out under heavy pulling loads, said ballast containing from not more than about 80% of a mixture of graunlar material having a particle size of from —10 to +100 mesh and fine powder particles having a fineness of 100 mesh or finer, the amount of the fine powder being sufficient that during rotation of the tire the ballast is entrained in the enclosed gas substantially filling the volume of the tire with a densified compressible pneumatic medium for the tire.

4. A ballasted vehicle tire comprising a resilient vehicle tire having an annular sealed chamber inflatable with gas under pressure, a particle ballast partially filling said chamber to approximately 80–97% of its capacity with the tire at rest, and leaving a void of 3–20% at the top of the tire, a gas maintained within said chamber under pressure to inflate said tire and to provide a pneumatic tire capable of flattening out under heavy pulling loads, said ballast containing about 50% granular material in the range of about 10 to 100 mesh and about 50% fine powder particles having a fineness of about 100 mesh or finer, whereby during rotation of the tire the ballast is entrained in the enclosed gas substantially filling the volume of the tire with a densified compressible pneumatic medium for the tire.

5. A ballasted vehicle tire comprising a resilient vehicle tire having an annular sealed chamber inflatable with gas under pressure, a particle ballast partially filling said chamber to approximately 80–97% of its capacity with the tire at rest, and leaving a void of 3–20% at the top of the tire, a gas maintained within said chamber under pressure to inflate said tire and to provide a pneumatic tire capable of flattening out under heavy pulling loads, said ballast containing about 30–50% granular material having a fineness of about 15 mesh and about 70–50% fine powder particles having a fineness of about 100 mesh or finer, whereby during rotation of the tire the ballast is entrained in the enclosed gas substantially filling the volume of the tire with a densified compressible pneumatic medium for the tire.

6. A ballasted vehicle tire according to claim 5 in which the fine powder particles are talc of about 100 mesh or finer.

References Cited in the file of this patent

UNITED STATES PATENTS

| | | |
|---|---|---|
| 1,891,975 | Galvin | Dec. 27, 1932 |
| 2,884,039 | Hicks | Apr. 28, 1959 |